No. 833,986. PATENTED OCT. 23, 1906.
W. H. TILSON.
CORN HARVESTING MACHINE.
APPLICATION FILED OCT. 4, 1905.

4 SHEETS—SHEET 1.

Witnesses William H. Tilson Inventor
by C. A. Snow & Co
Attorneys

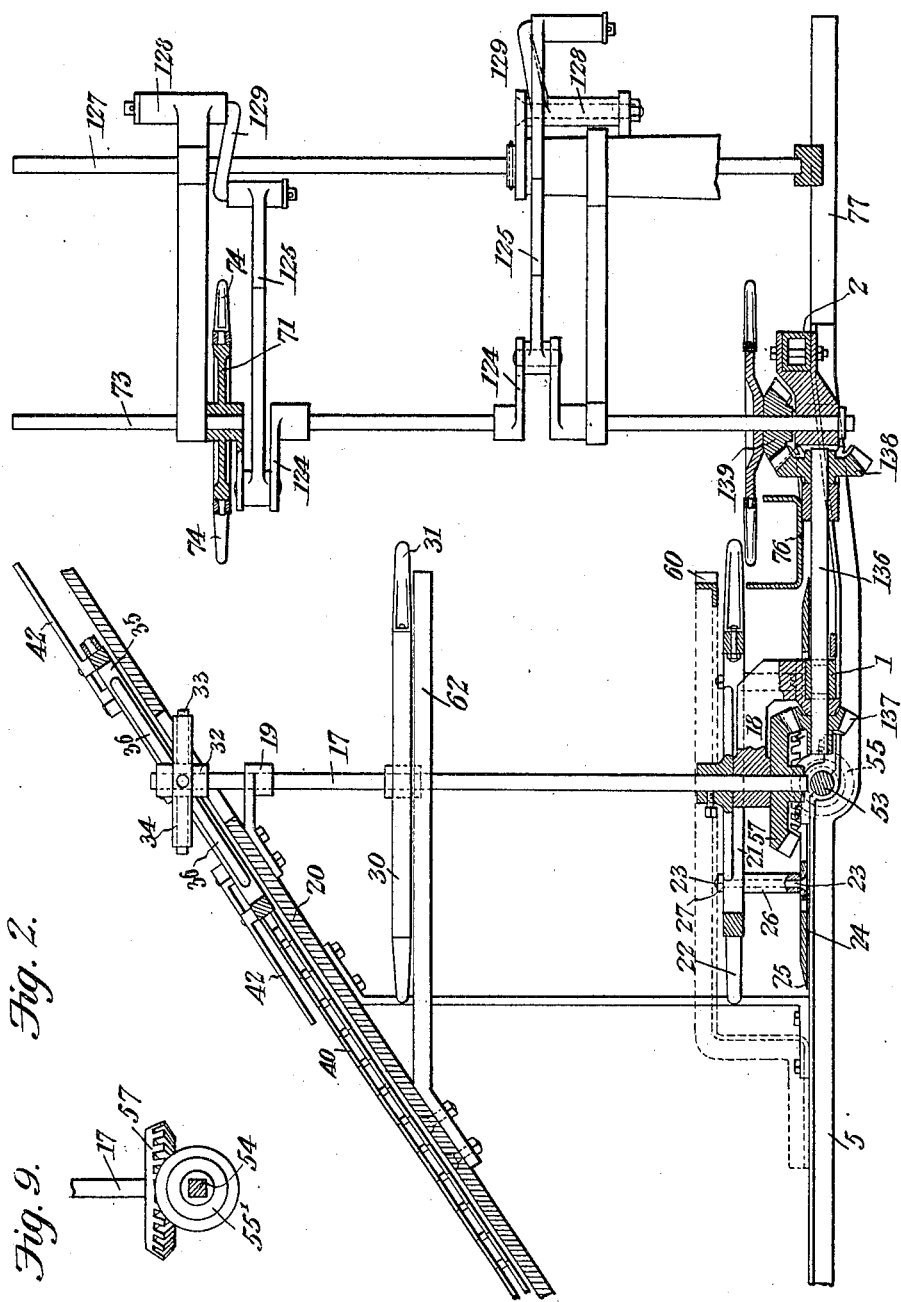

No. 833,986. PATENTED OCT. 23, 1906.
W. H. TILSON.
CORN HARVESTING MACHINE.
APPLICATION FILED OCT. 4, 1905.
4 SHEETS—SHEET 3.
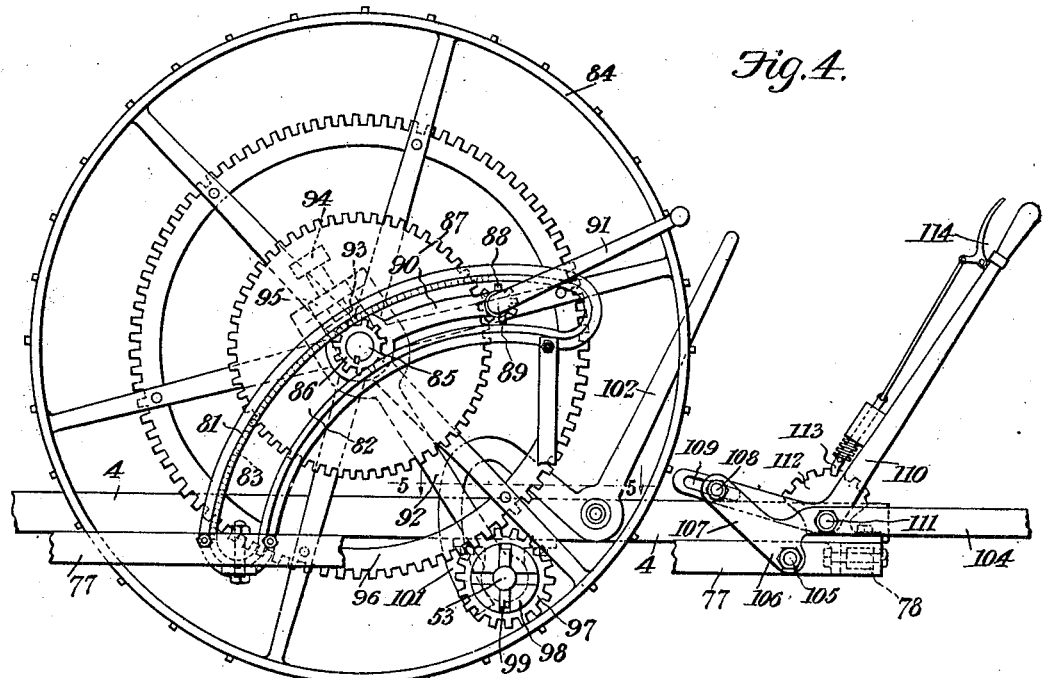
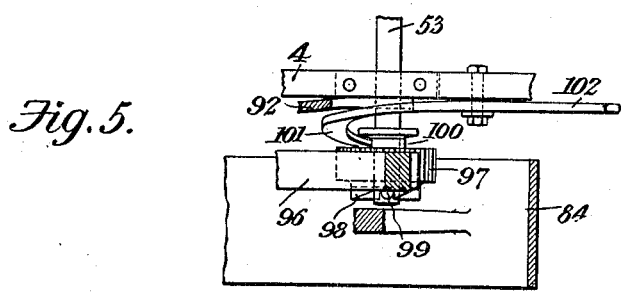
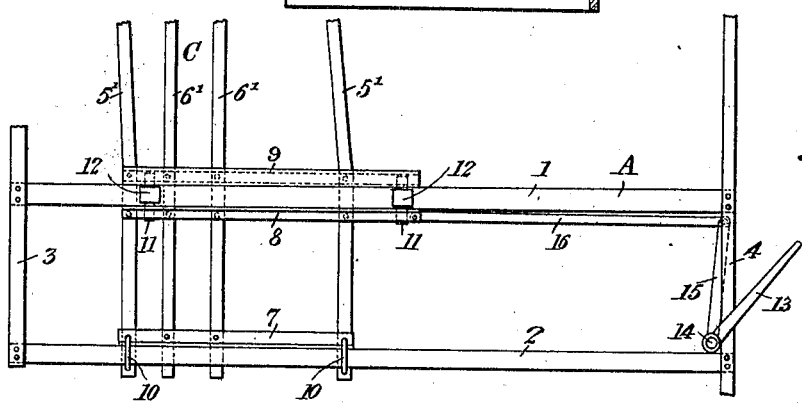
Witnesses
William H. Tilson Inventor
by C. A. Snow & Co. Attorneys No. 833,986. PATENTED OCT. 23, 1906.
W. H. TILSON.
CORN HARVESTING MACHINE.
APPLICATION FILED OCT. 4, 1905.

4 SHEETS—SHEET 4.

Witnesses

William H. Tilson Inventor
by C. A. Snow & Co
Attorneys

UNITED STATES PATENT OFFICE.

WILLIAM HENDERSON TILSON, OF PLAINVIEW, TEXAS.

CORN-HARVESTING MACHINE.

No. 833,986.     Specification of Letters Patent.     Patented Oct. 23, 1906.

Application filed October 4, 1905. Serial No. 281,339.

*To all whom it may concern:*

Be it known that I, WILLIAM HENDERSON TILSON, a citizen of the United States, residing at Plainview, in the county of Hale and State of Texas, have invented a new and useful Corn-Harvesting Machine, of which the following is a specification.

This invention relates to corn-harvesting machines of that class which are provided with cutting apparatus for severing the stalks, with carrying apparatus for conveying the stalks in a standing or upright position to the point of discharge, with binding apparatus for tying the stalks into bundles, and with bundle-carrying mechanism upon which the bundles may be accumulated until a sufficient quantity to form a shock of the desired size is supported upon the carrier, which latter may then be tripped, thereby depositing the bundles upon the ground, to be subsequently formed into a shock or conveyed to a temporary storage-place, as desired.

Among the objects of the present invention are to improve and to simplify the construction and operation of this class of machines; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention.

Figure 1:
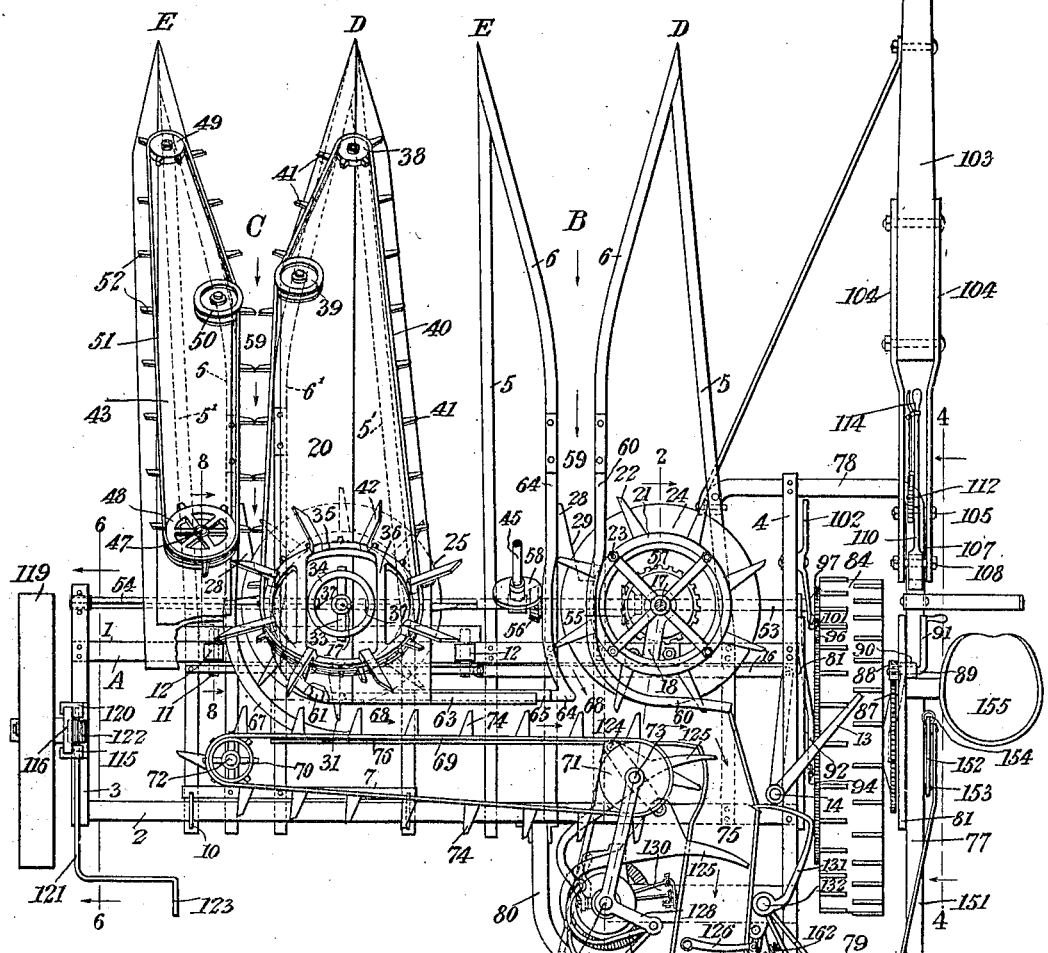
Figure 10:
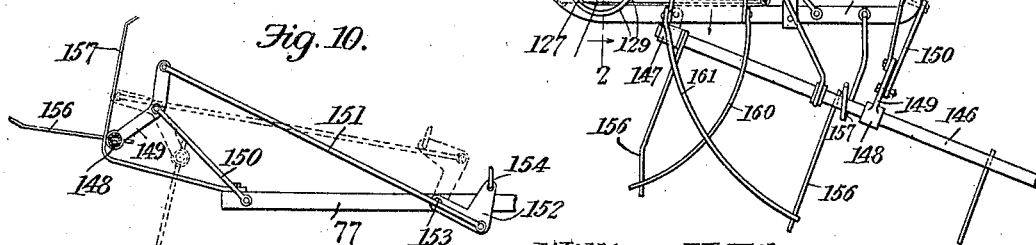
Figure 6:
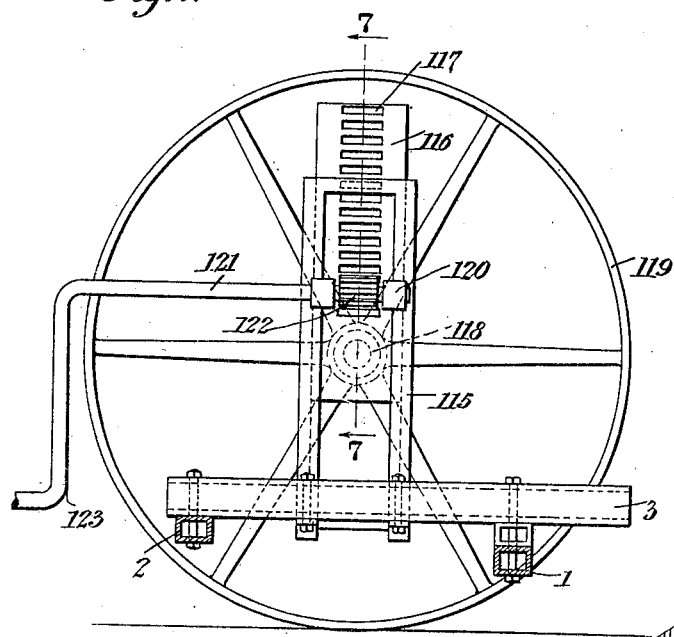
Figure 7:
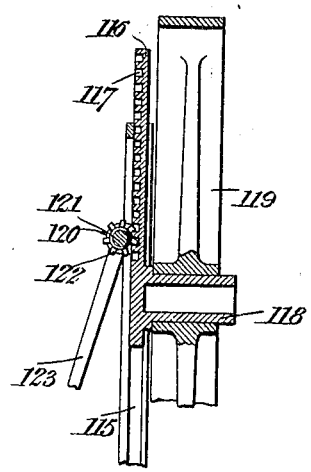
Figure 8:
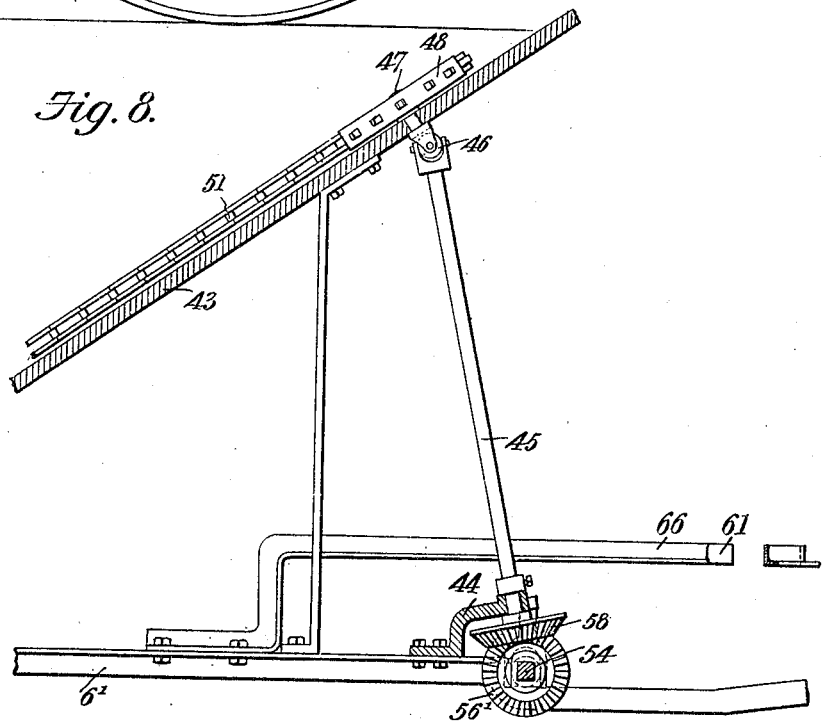

In the drawings, Figure 1 is a top plan view of a corn-harvesting machine constructed in accordance with the principles of the invention, said view being made partly in section for the purpose of exposing subjacent parts of the machine. Fig. 2 is a vertical sectional view taken on the plane indicated by the line 2 2 in Fig. 1. Fig. 3 is a detail plan view of a portion of the main frame of the machine, showing the auxiliary slicing frame which supports one set of cutting mechanism and the means for adjusting said auxiliary frame. Fig. 4 is a vertical sectional detail view taken on the plane indicated by the line 4 4 in Fig. 1 and showing in elevation the bull-wheel of the machine and the mechanism for adjusting the frame. Fig. 5 is a sectional detail view taken on the plane indicated by the line 5 5 in Fig. 4. Fig. 6 is a sectional view taken on the line 6 6 in Fig. 1 and showing the grain-wheel and the means for adjusting the frame with relation thereto. Fig. 7 is a sectional detail view taken on the line 7 7 in Fig. 6. Fig. 8 is a sectional detail view taken on the line 8 8 in Fig. 1. Fig. 9 is a detail view illustrating the gearing whereby the upright shaft 17 of the movable gathering, guiding, and cutting apparatus is connected with and adapted to receive motion from the main driving-shaft. Fig. 10 is a detail view in side elevation of the bundle-carrying mechanism.

Corresponding parts in the several figures are indicated throughout by similar characters of reference.

The machine of the present invention, as illustrated in the accompanying drawings, is a two-row harvester, it being adapted to operate simultaneously upon two rows of corn. Inasmuch as the rows of corn are not always planted at the same distance apart, the distance usually varying from thirty-six to forty-eight inches, provision is made for the lateral adjustment of one of the corn engaging and cutting mechanisms in order that the machine may be set or gaged to engage rows of corn at various distances apart. To this end a main frame A is primarily provided, the same including the main cross-beams 1 2 and the main side beams 3 and 4, which are securely connected together, as may be plainly seen in Figs. 1 and 3, it being understood with regard to the frame structure that it is to be composed mainly of structural iron or steel and that tubular beams and angle-bars are to be employed in the most advantageous manner throughout the general structure, the preferred forms having been illustrated in the drawings.

The machine includes the relatively stationary cutting and gathering apparatus B and the relatively movable cutting and gathering apparatus C, the only important difference between which resides in the fact that the former apparatus is stationary upon the main frame, while the latter is stationary upon a frame which is slidably supported upon the main frame and which also constitutes a portion of the guiding apparatus. The apparatus B includes longitudinal base-bars 5 5 and 6 6, which are permanently secured upon and extend forwardly from the front and rear main beams 1 and 2 of the frame, the bars 5 5, which are the outer bars, being approximately parallel or slightly converging in a forward direction, while the inner bars 6 6 are diverged forwardly and connected at their forward extremities with the forward extremities of the bars 5 5, thus forming the pointed divergent guides between which the cornstalks are guided to the cutting mechanism.

The apparatus C comprises the outer base-bars 5' 5' and the inner base-bars 6' 6', the general construction of which is identical to that of the base-bars in the apparatus B; but the bars 5' 5' and 6' 6' instead of being secured upon the main frame are connected at and near their rear ends by cross-bars 7, 8, and 9, the first of which lies adjacent to the rear cross-bar 2 of the main frame, which latter is surrounded by clips 10 10, connected with the outer base-bars 5'. The bars 8 and 9, which lie adjacent to the rear and front sides of the cross-bar 1, are connected by means of pins 11, carrying rollers 12, which ride upon the beam 1, thus permitting the base of the apparatus C to travel laterally upon the main frame. The adjustment of the apparatus C is effected by means of a hand-lever 13, disposed within reach of the driver or operator and extending from a vertical shaft 14, having a crank 15, which is connected by a link 16 with the cross-bar 8 of the apparatus C. No specific means have been shown for securing the lever 13 in adjusted position; but such means are well known in the art and may be used when desired.

Each of the devices B and C, both of which are practically of identical construction and the parts of which will therefore be designated by like numerals, includes an outer guide D and an inner guide E, the outer guides being those which are distant from the grain side of the machine, as will be readily understood. It will be observed that each of the guides D and E includes what has already been designated as an outer and an inner base-bar, the latter designation being with reference to the structures B and C individually.

Supported between the base-bars of the outer guides are upright shafts 17, which are the main cutter-carrying shafts. Said shafts are supported near their lower ends, as in bearings 18, supported either by the stationary or by the adjustable frame of the machine, as the case may be. The shafts 17 are supported near their upper ends in bearings, as 19, (best seen in Fig. 2 of the drawings,) said bearings being bracketed upon the inclined guide-bars 20, which are connected at their lower front ends with the points of the guides D and which serve in the usual manner to support the gathering-chains, which will be presently described.

Upon the shafts 17, near their lower ends, are supported gathering-disks 21, consisting of wheels having radially-extending spokes 22, that extend across the space or path between the guides D and E. Each of the wheels or disks 21 is provided with a plurality of depending bolts 23, the heads of which serve to support an annular cutting-disk 24, having a beveled cutting edge 25, said cutting-disk being spaced from the wheel or disk 21 by means of spacing-sleeves 26 upon the bolts 23, which latter are equipped with tightening-nuts 27. The cutting-disks are supported directly above and adjacent to the horizontal planes of the base-bars of the devices B and C, and they are adapted to coöperate with stationary cutters 28, suitably connected with and supported by the base-bars of the devices. Said stationary cutters have cutting edges 29, which are disposed obliquely, as shown, so that they will gradually engage and partly sever the cornstalks, even before the latter are engaged by the rotary cutters, which have a shearing action with relation to the stationary cutters, whereby the stalks will be severed very easily and quickly and without requiring the exercise of much power.

Upon the shafts 17 a suitable distance above the gathering-disks 21 are supported similar gathering-disks 30, having radial spokes 31, which, like the spokes of the disks 21, extend across the paths or passages between the guides D and E.

Upon each of the shafts 17, near the upper ends of said shafts, there is supported a hub 32, having oppositely-extending radial arms 33, serving as trunnions, upon which there is pivotally supported a ring or annulus 34. A sprocket-wheel 35 is provided with parallel cross-bars 36, having diametrically opposite inwardly-extending trunnions 37, pivotally engaging the ring 34, thus constituting a gimbal joint which permits the sprocket-wheel to rotate in an inclined plane when the shaft whereby it is driven rotates upon an approximately vertical axis, its position when in operation being practically parallel to the inclined guides 20, the elevated rear ends of which are to be supported in any suitable manner by parts of the frame structure of the machine.

Near the points of the inclined guide members 20 are supported sprocket-wheels 38 and idlers 39, that serve, in conjunction with the sprocket-wheels 35, to support the gathering-chains 40, the links of which are provided at intervals with fingers 41, extending into the path or passage between the guides D and E. Each of the sprocket-wheels 35 is provided upon its upper side with radially-extending spokes 42, which are sufficiently elevated above the rims of the sprocket-wheels to prevent them from interfering with the operation of the chains 40, and said spokes being extended across the path or passage between the guides D and E to coöperate with the gathering-disks 21 and 30 and with the chain 40 in moving the cornstalks into contact with the cutting apparatus and in a rearward direction after being severed by the cutters.

The outer guides E E include inclined guide-bars 43, suitably supported at their elevated rear ends and suitably connected at their front ends with the points of the base-bars of the inner guides. Suitable bearings, as 44, are provided for the lower ends of slightly-inclined or forwardly-tilted shafts 45, the upper ends of which are connected by universal joints, as 46, with stub-shafts 47, journaled in the inclined guides 43, and each carrying a sprocket-wheel 48, which serves, in connection with sprockets 49 and idlers 50 upon the inclined guides 43, to support the gathering-chains 51, the links of which are provided at intervals with fingers 52, adapted to extend into the paths between the guides D and E. It will thus be seen that the gathering-chains 40 and 51 coöperate to convey the corn entering between the guides in a rearward direction and into engagement with the cutting apparatus and with the spoked wheels upon the shafts 17.

Suitable bearings are provided in the frame for the main driving-shaft 53, which is driven by the bull-wheel of the machine, as will be hereinafter described. Said main shaft has a non-circular portion 54, which is in slidable engagement with bevel-pinions 55' (see Fig. 9) and 56', meshing with bevel-pinions 57 and 58 near the lower ends of the shafts 17 and 45, respectively, which are included in the apparatus generally designated C, which is mounted slidably with relation to the main frame, it being obviously necessary that the transmission-wheels 55' 56' must be movable with said apparatus when the latter is adjusted to any of the different positions which it may occupy. The shafts 17 and 45 of the stationary apparatus B are in like manner driven by bevel-pinions 55 and 56, secured upon the circular portion of the main shaft 53 and meshing with bevel-gears 57 and 58 upon the shafts 17 and 45 of the apparatus B. It is obvious that the driving-gears are so disposed that the inner leads of the gathering-chains 40 and 51 will be moved in a rearward direction when the machine is in operation, as indicated by darts in Fig. 1 of the drawings.

The passages 59 between the guides D and E are continued rearwardly by means of approximately horizontal guide-rails, of which two sets are used, said sets being, respectively, supported upon the base-frames and upon the inclined guide members 20 and 43 of the devices B and C, respectively, and the lower guide-rails being disposed in the same vertical plane as the upper guide-rails. The lower guide-rails 60 and 61 and the upper guide-rails 62 and 63, which are associated with the outer guides D of the devices B and C, respectively, are bent or curved laterally after extending across the annular knives or cutters upon the shafts 17 in such a manner as to gradually push the severed cornstalks out of engagement with said annular cutters as they are carried in a rearward direction, the carrying of the cornstalks being effected at this point by the spokes upon the wheels 21, 30, and 35, respectively, it being observed that the wheel 35, which is a sprocket-wheel, rotates in an inclined plane, so that the spokes 42 associated therewith will tend to brush the tops or heads of the stalks in an upward direction, thereby facilitating the retention of the stalks in an upright position. The lower and upper rails 64 and 65, associated with the inner guide E of the device B, are extended laterally in a direction opposite to the guide-rails 60 and 62 and are telescoped with the guide-rails 61 and 63, which, like the guide-rails 64 and 65, are preferably constructed of angle-irons, which nest together, as will be best seen in Fig. 1. The lower and upper guide-rails 66 and 67, which are associated with the inner guide E of the device C, are extended laterally approximately parallel to the guide-rails 61 and 62. It will thus be seen that the guide-rails 61, 63, 60, 62, 64, and 65 coöperate to form what may be described as one side wall of a passage 68, communicating with the passages 59, and the other side wall of which is formed by the guide-rails 66 and 67 in conjunction with guide-chains 69, that are supported upon sprocket-wheels 70 and 71 upon a pair of upright shafts 72 and 73, supported for rotation in rear of the vertical plane in which the shafts 17 are located. The guide-chains 69 are provided at intervals with fingers 74, extending into the passage 68, as will be readily seen in Fig. 1. It will also be clearly seen by reference to said figure that the cornstalks which are severed by the cutting apparatus connected with the device C are conveyed standing through the passage 68 to the point where the later merges with the passage 59 of the device B, from which point all the stalks coming from the two passages 59 are merged together and conveyed, still in an upright position, into a chute 75, extending in a rearward direction, as will be clearly seen in Fig. 1 of the drawings.

Suitably mounted upon the frame of the machine is a guide-trough 76, (best seen in Fig. 2 of the drawings,) the side walls of which coincide with the guide-rails and members combining to constitute the passage 68 and which serves to support the butts of the stalks as the latter travel in the direction of their eventual point of discharge.

77 designates a frame-bar which is spaced from and disposed approximately parallel to the side bar 4 of the main frame, said side bar 4 being extended forwardly and rearwardly from the cross-bars 1 and 2. The bar 77 has lateral extensions 78 79 at its front and rear ends, said extensions being connected with the front and rear ends of the frame-bar 4, the members 78 being also connected with one of the frame-bars 5, while the member 79 has a forwardly-extending terminal 80, which has been shown as being connected with the rear cross-bar 2 of the main frame. The frame-bars 4 and 77 support upon their opposite sides a pair of segments 81, having slots 82, the upper edges of which have been shown as provided with ratchet-teeth 83, the slots 82 being concentric with the axis of the main shaft 53. 84 is the main drive-wheel or bull-wheel, which is mounted upon a short axle 85, that extends through the slots 82, and is provided with pinions 86, engaging the racks 81. These pinions are fixed upon the axle, while the bull-wheel is mounted to rotate freely thereon. Connected with the shaft 85 is a spur-wheel 87, meshing with a pinion 88 upon a shaft 89, which is journaled in a link 90, loosely connected with the shaft 85, and provided with a crank or handle 91, whereby it may be manually rotated, thus causing the rotation of the spur-wheel 87, shaft 85, and pinions 86, which last named by engaging the racks 83 will effect the adjustment in an upward or downward direction of said racks 83 and the frame with which they are connected.

92 designates a link connecting the bull-wheel-carrying shaft 85 with the main shaft 53 and serving to brace the two shafts and to space them equally apart in any position occupied by the former with relation to the latter. The upper end of the link is bifurcated and is provided with an adjustable boxing 93 for the shaft 85, with which said boxing is forced into contact by means of a set-screw 94, operating through a cross-bar 95 at the bifurcated end of the link.

The bull-wheel carries a spur-wheel 96, which may be mounted securely upon the spokes thereof and which meshes with a pinion 97, supported for rotation upon the shaft 53. The pinion 97 has a ratchet-face 98 constituting a clutch member which is adapted to engage a pin 99, extending transversely through the shaft 53, when the machine moves in a forward direction. The pinion 97, or the hub of the latter, has an annular groove 100 engaged by the spiral or cam-shaped terminal 101 of a lever 102, which is pivoted upon the frame within reach of the operator and the purpose of which is to move the clutch-face of the pinion 97 into and out of engagement with the pin 99 of the shaft 53, and thus throwing said shaft and the parts driven thereby into or out of operation, as desired.

The tongue 103 of the machine is secured between a pair of plates 104, which are pivoted upon the frame-bar 77 upon a bolt or pin 105, that extends through downward offsets 106 near the rear ends of said plates. The latter are provided with upward and rearward extending terminals 107, connected by a pin or bolt 108, that extends through a slot 109 in a bell-crank lever 110, which is fulcrumed upon a pin 111, connected with and concentric with a rack-segment 112, secured upon the frame-bar 77. Said segment is engaged by a spring-actuated stop 113, connected with the upwardly-extending arm of the bell-crank lever, which latter carries an operating-handle 114 for the spring-actuated stop. It will be readily seen that by manipulating the bell-crank lever 110, the plates 104 may be adjusted so as to place the tongue at various angles in a vertical plane with relation to the frame of the machine, thus enabling the latter to be adjusted to raise or lower the points of the guides D and E, according to the condition of the corn that is to be operated upon.

The grain side of the frame is provided with an upright frame 115, affording bearing means for a vertically-movable slide 116, having a rack 117 formed upon the face thereof, the slide 116 being provided with a spindle 118, upon which the grain-wheel 119 is journaled. The upright frame 115 is provided with bearings 120 for a shaft 121, having a pinion 122, which is in constant engagement with the rack 117. The shaft 121 is also provided with a manually-operated crank 123, whereby it may be rotated for the purpose of bringing about any desired vertical adjustment of the grain end of the frame with relation to its supporting-wheel 119.

The shaft 73, upon which are mounted the sprocket-wheels 71, which serve in part to support the chains 69 of the carrying apparatus, is provided with oppositely-extending cranks 124, located in different planes, as will be best seen in Fig. 2 of the drawings. Pivotally connected with said cranks, from which they receive a gyratory motion, are packers 125, which are adapted to alternately sweep across the path or chute 75 for the purpose of advancing the corn passing into and through said chute rearwardly in the latter in the direction of the compressor or trip 126, which obstructs the discharge-opening at the rear end of the chute. Supported in rear of the shaft 73 and at a suitable distance therefrom is a shaft 127, adjacent to which bearings 128 are provided for links 129, the free ends of which are connected with the packer-arms 125, which latter are thereby steadied. The shaft 127 carries knotting mechanism, conventionally illustrated at 130 and which coöperates with a needle 131, carried by a vertical shaft 132, upon the opposite side of the chute 75, to tie the bundles of corn confined in front of the compressor or trip 126. These parts will be more fully described in a separate application for Letters Patent, and they are not claimed in the present application.

The packer-carrying shaft 73 is driven from the main shaft 53 by means of an intervening shaft 136, provided upon the ends thereof with bevel-pinions 137 and 138, the former of which meshes with the bevel-gear 57 upon the shaft 17 of the device B, while the pinion 138 meshes with a bevel-pinion 139 upon the shaft 73, near the lower end of the latter. It will here be noted that the cutters 24, connected with the shafts 17, are made of annular shape in order that the bevel-gears 57, near the lower ends of said shafts, may mesh with the pinions upon the driving-shafts, and in the case of the shaft 17, associated with the device B, with the pinion 137 upon the shaft 136, through which rotary motion is continuously imparted to the packer-carrying shaft 73 when the machine is in operation.

The bundle-carrier connected with the machine includes a shaft 146, one end of which is journaled in a socket 147, having pivotal connection with the frame of the machine, said shaft having an additional support in a sleeve 148 at one end of a lever 149, which is fulcrumed upon the rear end of a link 150, the forward end of which is pivotally connected with one of the rear corners of the frame of the machine. The lower or rear end of the lever 149 is connected, by means of a link 151, with a bell-crank 152, pivoted upon the side of the frame, as at 153, and having an operating member 154, which extends upwardly within reach of the driver or operator, whose seat 155 is suitably supported upon the frame member 77 of the machine. The shaft 146 is provided with rearwardly-extending arms 156, adapted to support a number of bundles of corn, when the shaft 146 is supported in its normal position with the arms 156 extending in an upward and rearward direction, said shaft being obviously retained in such supporting position when the end of the bell-crank 152, with which the link 151 is connected, is below the pivotal point or fulcrum of said bell-crank. To trip the bundle-carrier, it is only necessary to elevate the free end of the bell-crank, when the lever 149 will be tilted, with the obvious effect of tilting the shaft of the bundle-carrier, so as to discharge the bundles carried thereby. It will also be seen that the bundle-carrying shaft is not merely tilted, but that its free end is at the same time moved in a rearward direction to a position approximately indicated in dotted lines in Fig. 10 of the drawings. An arm 157, which is secured to the rear frame-bar and which extends rearwardly under the shaft 146, is thence extended in an upward direction to constitute a pusher, which will operate to positively discharge the bundles from the bundle-carrier, which latter having been relieved from the weight may be readily restored to normal position.

Extending rearwardly from the discharge-chute 75 are two spring members or resilient arms 160 and 161, the former of which is attached to the side which is near the bull-wheel of the machine, while the latter is attached to the side distant from the bull-wheel. These spring-arms are disposed in different horizontal planes, the arm 161 being disposed or supported quite a distance above the arm 160, the arms being curved laterally across each other, so that when a bundle leaves the chute it will be guided by the two arms, but will at the same time be tilted by the upper arm 161, so as to fall upon the arms of the bundle-carrier in the proper direction—that is, with the tops thrown outward and with the butts in the direction of the grain side of the machine.

From the foregoing description, taken in connection with the drawings hereto annexed, the operation and advantages of this invention will be readily understood by those skilled in the art to which it appertains. When the machine is drawn over the field, the frame is first adjusted by means of the lever 110, so as to set the points of the corn-guiding devices at the proper distance above the ground to effect the most satisfactory results. The entire frame is also adjusted vertically with relation to the supporting-wheels by the means provided for the purpose. As the machine advances the cornstalks will enter between the guides of the devices B and C, which latter have previously been adjusted laterally by means of the hand-lever 13, so as to space the corn-guiding devices properly apart, according to the distance between the rows. The stalks, having been severed by the cutting devices, are carried by the mechanism provided for the purpose to the chute 75, within which the packers 125 operate to compress a quantity of stalks sufficient to form a bundle between the side walls of the chute and the movable gate 126. As soon as the latter is partly tilted in a rearward direction by the accretion of pressure the binding mechanism is set into motion and the bundle is tied prior to being discharged onto the bundle-carrier, upon which it is tilted in the proper direction by the combined action of the springs 160 and 161. Immediately upon the discharge of a bundle the gate 126 is restored to normal position for a repetition of the operation, the tripping device including means for automatically restoring the gate, although this operation may be performed by an independent spring, as 162, bearing against the arm 142 of the shaft 140. The bundle-carrier is tripped at suitable intervals by the operator, as herein previously described.

Having thus described the invention, what is claimed is—

1. A double-row corn-harvester including a main frame, an auxiliary frame supported thereon for lateral adjustment a guiding gathering and cutting mechanism upon the main frame and one upon the adjustable frame, said mechanisms including guide-rails forming corn-passages and the proximate guide-rails of the two mechanisms being disposed in telescoping relation.

2. A double-row corn-harvester including a main frame and an adjustable frame supported thereon having lateral movement, a guiding gathering and cutting mechanism upon the main frame and one upon the adjustable frame, said mechanisms including guide-rails forming corn-passages and the proximate guide-rails of the two mechanisms being disposed in telescopic relation; in combination with endless carrying means constituting one wall of the passage, the other wall of which is formed mainly by the telescoping guide-rails.

3. A double-row corn-harvester including a main frame, an auxiliary frame supported thereon for lateral adjustment, corn guiding gathering and cutting means upon the two frames said guiding means including rails forming corn-passages and the proximate guide-rails of the two mechanisms being disposed in telescopic relation; in combination with endless carrying means constituting one wall of a lateral passage the other wall of which is formed by the telescoping guide-rails, a rearwardly-extending chute communicating with the lateral passage and means for assisting the passage of cornstalks from the lateral passage into the chute.

4. A double-row corn-harvester comprising a fixed cutting and gathering apparatus, beams supporting said apparatus, a movable cutting and gathering apparatus also mounted upon said beams and having rollers that operate upon one beam and clips that receive another beam.

5. A double-row corn-harvester comprising a fixed cutting and gathering apparatus mounted upon beams, a movable cutting and gathering apparatus also mounted upon said beams and having rollers that engage one beam and clips that surround another beam, and a lever mechanism operatively connected with said movable cutting and gathering apparatus.

6. A double-row corn-harvester comprising a fixed cutting and gathering apparatus and a movable cutting and gathering apparatus, a corn-guiding passage located adjacent both of said apparatus and being common to both irrespective of the position of the movable cutting and gathering apparatus.

7. A double-row corn-harvester comprising a fixed cutting and gathering apparatus and movable cutting and gathering apparatus, a corn-guiding passage located adjacent both of said apparatus, a chain mounted for movement at one side of said passage, the other side of said passage having telescoping wall-sections.

8. A double-row corn-harvester comprising a fixed cutting and gathering apparatus and a movable cutting and gathering apparatus, a corn-guiding passage located adjacent to both of said cutting and gathering apparatus one side of said corn-guiding passage being formed by telescopic walls.

9. A corn-harvester comprising a fixed cutting and gathering apparatus and a movable cutting and gathering apparatus, and a corn-guiding passage located adjacent to both of said cutting and gathering apparatus, said corn-guiding passage being common to both of said cutting and gathering apparatus irrespective to the position of the movable cutting and gathering apparatus one side of said corn-guiding passage being provided with a moving chain.

In testimony that I claim the foregoing as my own I have hereto affixed my signature in the presence of two witnesses.

WILLIAM HENDERSON TILSON.

Witnesses:
L. LEE DYE,
B. E. SEBASTIAN.